(12) United States Patent
Jung et al.

(10) Patent No.: US 8,437,612 B2
(45) Date of Patent: May 7, 2013

(54) STORAGE MEDIUM RECORDING TEXT-BASED SUBTITLE STREAM, REPRODUCING APPARATUS AND REPRODUCING METHOD FOR REPRODUCING TEXT-BASED SUBTITLE STREAM RECORDED ON THE STORAGE MEDIUM

(75) Inventors: Kil-soo Jung, Hwaseong-si (KR); Sung-wook Park, Seoul (KR); Kwang-min Kim, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1050 days.

(21) Appl. No.: 12/408,204

(22) Filed: Mar. 20, 2009

(65) Prior Publication Data

US 2009/0185075 A1     Jul. 23, 2009

Related U.S. Application Data

(63) Continuation of application No. 11/064,825, filed on Feb. 25, 2005, now Pat. No. 7,529,467.

(30) Foreign Application Priority Data

Feb. 28, 2004  (KR) ................. 2004-13827
May 7, 2004    (KR) ................. 2004-32290

(51) Int. Cl.
*H04N 5/92*        (2006.01)
(52) U.S. Cl.
USPC ....................................................... 386/244
(58) Field of Classification Search .......... 386/244–246, 386/353, 354, 357; 348/467, 468
See application file for complete search history.

(56) References Cited

U.S. PATENT DOCUMENTS

| | | | |
|---|---|---|---|
| 4,040,088 | A | 8/1977 | Hannan |
| 5,519,443 | A | 5/1996 | Salomon et al. |

(Continued)

FOREIGN PATENT DOCUMENTS

| | | |
|---|---|---|
| CN | 1139273 | 1/1997 |
| CN | 1145152 | 3/1997 |

(Continued)

OTHER PUBLICATIONS

Japanese Office Action issued on Jun. 22, 2010, in corresponding Japanese Patent Application No. 2007-500690 (5 pages).

(Continued)

*Primary Examiner* — David Harvey
(74) *Attorney, Agent, or Firm* — NSIP Law

(57) ABSTRACT

A non-transitory computer readable storage medium and apparatus to reproduce from a storage medium are provided. The apparatus has a video decoder to decode audio-visual data and a subtitle decoder to receive text-based subtitle data having dialog presentation units and a dialog style unit defining a set of output styles to be applied to the dialog presentation units, converting the dialog presentation units into bitmap images based on the dialog style unit, and controlling an output of the converted dialog presentation units synchronized with decoded audio-visual data. Each dialog presentation unit has dialog text information, time information indicating a time for the dialog text information to be output, palette information defining colors to be applied to the dialog text information, and a color update flag indicating whether only the palette information has changed as compared with a graphical composition of a previous dialog presentation unit.

6 Claims, 20 Drawing Sheets

U.S. PATENT DOCUMENTS

| | | | |
|---|---|---|---|
| 5,721,720 | A | 2/1998 | Kikuchi et al. |
| 5,999,225 | A | 12/1999 | Yagasaki et al. |
| 6,204,883 | B1 | 3/2001 | Tsukagoshi |
| 6,253,221 | B1 | 6/2001 | Kim |
| 6,288,990 | B1 | 9/2001 | Fujiie et al. |
| 6,297,797 | B1 | 10/2001 | Takeuchi et al. |
| 6,415,100 | B1 | 7/2002 | Park |
| 7,369,180 | B2 | 5/2008 | Xing |
| 7,756,398 | B2 * | 7/2010 | Yoo et al. .................. 386/244 |
| 2001/0024473 | A1 | 9/2001 | Nakaya et al. |
| 2003/0021586 | A1 | 1/2003 | Suh |
| 2004/0146283 | A1 | 7/2004 | Seo et al. |
| 2004/0168203 | A1 | 8/2004 | Seo et al. |
| 2004/0208488 | A1 | 10/2004 | Fuchigami et al. |
| 2005/0207736 | A1 | 9/2005 | Seo et al. |
| 2005/0213944 | A1 * | 9/2005 | Yoo et al. .................. 386/96 |
| 2007/0140659 | A1 * | 6/2007 | Yoo et al. .................. 386/95 |
| 2007/0201831 | A1 * | 8/2007 | Yoo et al. .................. 386/95 |
| 2009/0263106 | A1 | 10/2009 | Seo et al. |

FOREIGN PATENT DOCUMENTS

| | | |
|---|---|---|
| CN | 1205794 | 1/1999 |
| CN | 1914903 | 2/2007 |
| EP | 0 735 776 | 10/1996 |
| EP | 791 925 | 8/1997 |
| JP | 08-241068 A | 9/1996 |
| JP | 10-210504 | 8/1998 |
| JP | 10-271439 A | 10/1998 |
| JP | 11-196386 | 7/1999 |
| JP | 2000-003561 | 1/2000 |
| JP | 2000-023082 | 1/2000 |
| JP | 2000-069423 | 3/2000 |
| JP | 2001-135066 | 5/2001 |
| JP | 2002-25197 | 1/2002 |
| JP | 2004-048396 | 2/2004 |
| KR | 2005-83102 | 8/2005 |
| RU | 2 367 036 C2 | 9/2009 |
| RU | 2378722 C2 | 1/2010 |
| TW | 200301060 | 6/2003 |
| TW | 569630 | 1/2004 |
| WO | WO 03/058973 | 7/2003 |
| WO | WO 2005/013276 | 2/2005 |
| WO | WO 2005/045835 | 5/2005 |
| WO | WO 2005/076276 A1 | 8/2005 |
| WO | WO 2005/079171 | 9/2005 |
| WO | WO 2005/091723 A2 | 10/2005 |
| WO | WO 2005/091728 A2 | 10/2005 |

OTHER PUBLICATIONS

Search Report Issued on Feb. 28, 2008 by the European Patent Office for European Patent Application No. 05726932.6-2223.

"Digital Video Broadcasting (DVB): Subtitling Systems; Final Draft ETSI EN 300 743", ETSI Standards, European Telecommunications Standards Institute, Vo. BC, No. V121, Jun. 2002, pp. 1-48.

Office Action issued in Chinese Patent Application No. 2005800003070 on Feb. 1, 2008.

Search Report issued in European Patent Application No. 05726932.6 on Oct. 17, 2007.

Microsoft Corporation, "Understanding SAM 1,0", originally published Oct. 2001 (updated Feb. 2003), pp. 1-11.

Office Action issued in Korean Patent Application No. 2004-32290 on Feb. 16, 2007.

U.S. Appl. No. 11/064,825, filed Feb. 25, 2005, Kil-soo Jung et al., Samsung Electronics Co., Ltd.

Preliminary Notice of the First Office Action of the Taiwanese Patent Application No. 94105743 dated Jul. 6, 2009.

Chinese Office Action issued on Jun. 10, 2010, in corresponding Chinese Application No. 200810135887.X (5 pages).

Japanese Office Action issued on Nov. 30, 2010, in corresponding Japanese Patent Application No. 2007-500690 (3 pages).

Japanese Notice of Reason for Rejection mailed Sep. 18, 2012, issued in counterpart Japanese Patent Application No. 2010-211755; 4 pages including English translation.

Russian Office Action mailed Jul. 30, 2012, issued in counterpart Russian Patent Application No. 2007146766; 8 pages including English translation.

Russian Office Action issued on Apr. 11, 2012 in counterpart Russian Patent Application No. 2007146766 (8 pages, with English language translation).

* cited by examiner

FIG. 4

```
Text_subtitle_stream () {                           /220
        dialog_style_unit() — 410
        num_of_dialog_presentation_units
        for (i=0; i<num_of_dialog_presentation_units; i++) {
                dialog_presentation_unit() — 420
        }
}
```

FIG. 5

```
                                          /310
dialog_style_unit () {
        unit_type
        reserved_for_futher_use
        unit_length
        dialog_styleset() — 510
}
```

FIG. 8

```
dialog_styleset () {
    player_style_flag —— 610
    reserved_for_future
    num_of_region_styles
    for (region_style_id=0; region_style_id<num_of_region_styles;
    region_style_id++) {   820
        region_style() {   830
            region_info() {
                region_horizontal_position
                region_vertical_position
                region_width
                region_height
                region_bg_color
            }
            text_horizontal_position
            text_vertical_position
            text_flow
            text_alignment
            line_space                    840
            font_id
            font_style
            font_size
            font_color
        }                          850
        user_changeable_styles() {
            number_of_user_styleset
            for(user_style_id=0;
            user_style_id< number_of_user_styleset;
            user_style_id++) {
                User_control_styleset() {
                    region_horizontal_position_direction
                    region_horizontal_position_delta
                    region_vertical_position_direction
                    region_vertical_position_delta
                    text_horizontal_position_direction
                    text_horizontal_position_delta
                    text_vertical_position_direction
                    text_vertical_position_delta
                    line_space_inc_dec
                    line_space_delta
                    font_size_inc_dec
                    font_size_delta
                }
            }
        }
    }
    palette( )    860
}
```

310

```
dialog_presentation_unit () {
        unit_type
        reserved_for_futher_use
        unit_length
        dialog_start_PTS  } 1310
        dialog_end_PTS    }
        dialog_palette_id — 1320
        num_of_regions
        for (region_id=0; region_id<num_of_regions; region_id++) {
                dialog_region() — 1330
                        continuous_present_flag
                        region_style_id  — 1332
                        region_subtitle() — 1334
                }
        }
}
```

FIG. 15

```
region_subtitle () {
        region_subtitle_length
        while (processed_length < region_subtitle_length) {
                escape_code  1510
                inline_style() {
                        num_of_inline_styles
                        for (i=0; i< num_of_inline_styles; i++) {
                                inline_style_type[i]
                                inline_style_value[i]
                        }
                }
                text_string — 1520
        }
}
```

FIG. 16

| Continuous Presentation Set #1 | Continuous Presentation Set #2 | Continuous Presentation Set #3 |
|---|---|---|
| DPU #1 | DPU #2 | DPU #3 | DPU #4 | DPU #5 |

FIG. 23

|  | Name | Meaning |
|---|---|---|
| 0 | Interactive Graphics | Interactive Graphics Stream Number |
| 1 | Audio | Audio Stream Number |
| 2 | Presentation graphics and Text Subtitle | Presentation graphics and Text subtitle stream Number |
| 3 | Angle | Angle Number |
| 4 | Title | Title Number |
| 5 | Chapter | Chapter Number |
| 6 | PlayList | PlayList id |
| 7 | PlayItem | PlayItem id |
| 8 | Presentation Time | Presentation Time in 45kHz |
| 9 | Timer | Navigation Timer |
| 10 | Selected Button | Button id in Selected State |
| 11 | Menu Page | Page id |
| 12 | Selected Style | Style id — 2310 |
| 13 | Parental | Parental Level |
| 14 | Video Configuration | Player Configuration for Video |
| 15 | Audio Configuration | Player Configuration for Audio |
| 16 | Audio Language | Language Code for Audio |
| 17 | Presentation Graphics and Text subtitle Language | Language Code for Presentation Graphics and Text subtitle |
| 18 | Menu Language | Language Code for Menu Description |
| 19 | – | reserved |
| 20 | – | reserved |

STORAGE MEDIUM RECORDING TEXT-BASED SUBTITLE STREAM, REPRODUCING APPARATUS AND REPRODUCING METHOD FOR REPRODUCING TEXT-BASED SUBTITLE STREAM RECORDED ON THE STORAGE MEDIUM

CROSS-REFERENCE TO RELATED APPLICATIONS

This application is a continuation of and claims all benefits of U.S. patent application Ser. No. 11/064,825, currently allowed, filed in the U.S. Patent Office on Feb. 25, 2005, now U.S. Pat. No. 7,529,467 which claims the benefit of Korean Patent Application Nos. 2004-13827 and 2004-32290, filed on Feb. 28, 2004 and May 7, 2004, respectively, in the Korean Intellectual Property Office, the disclosures of which are incorporated herein in their entirety by reference.

BACKGROUND OF THE INVENTION

1. Field of the Invention

The present invention relates to reproduction of a multimedia image, and more particularly, to a storage medium for recording a multimedia image stream and a text-based subtitle stream, a reproducing apparatus and a reproducing method for reproducing the multimedia image stream and the text-based subtitle stream recorded on the storage medium.

2. Related Art

To provide a high-density (HD) multimedia image, video streams, audio streams, presentation graphics streams to provide subtitles, and interactive graphics streams to provide buttons or menus for interactive with a user, are multiplexed into a main stream, also known as an audio-visual "AV" data stream, and recorded on a storage medium. In particular, the presentation graphics stream for providing subtitles also provides a bitmap-based image in order to display subtitles or captions on an image.

In addition to its big size, the bitmap-based caption data has a problem in that production of subtitle or caption data and edition of the produced caption data are very difficult. This is because the caption data is multiplexed with other data streams such as video, audio, and interactive graphic streams. Furthermore, there is another problem in that an output style of the caption data cannot be changed in a variety of ways, that is, to change one output style of the caption into another output style of the caption.

SUMMARY OF THE INVENTION

Aspects of the present invention advantageously provide a storage medium in which a text-based subtitle stream is recorded, and a reproducing apparatus and method for reproducing text-based subtitle data recorded on such a storage medium.

According to an aspect of the present invention, an apparatus for reproducing image data and text-based subtitle data recorded on a storage medium to display a caption on an image based on the image data, comprises: a video decoder for decoding the image data; and a subtitle decoder for converting presentation information item into a bitmap image based on style information, and for controlling output of the converted presentation information item synchronized with the decoded image data. The text-based subtitle data includes the presentation information item which is a unit of displaying the caption and the style information which specifies an output style of the caption.

The subtitle decoder may decode the subtitle data recorded separated from the image data and output the subtitle data, overlaying the subtitle data on the decoded image data. The style information and the presentation information may be formed in units of packetized elementary streams (PESs), and the subtitle decoder may parse and process the style information and the presentation information in units of PESs.

The style information may be formed with one PES and recorded in the front part of the subtitle data, and a plurality of presentation information items may be recorded in units of PESs after the style information, and the subtitle decoder may apply one style information item to the plurality of presentation information items.

In addition, the presentation information may include text information indicating the contents of the caption and composition information controlling the output of a bitmap image obtained by converting the text information. The subtitle decoder may control the time when the converted text information is output by referring to the composition information.

The presentation information may specify one or more window regions in which a caption is to be output on a screen, and the subtitle decoder may output the converted text information in the one or more window regions at the same time.

An output start time and an output end time of the presentation information among the composition information may be defined as time information on a global time axis used in a playlist that is a reproducing unit of the image data, and the subtitle decoder may synchronize the output of the converted text information with the output of the decoded image data by referring to the output start time and the output end time.

If the output end time information of a presentation information item currently reproduced is the same as the output start time information of a next presentation information item, the subtitle decoder may continuously reproduce the two presentation information items.

If the next presentation information item does not have to be reproduced, the subtitle decoder may reset an internal buffer between the output start time and the output end time, and if the next presentation information item has to be reproduced continuously, the subtitle decoder may maintain the buffer without resetting the same.

The style information may be a set of output styles that are pre-defined by the producer of the storage medium and are to be applied to the presentation information, and the subtitle decoder may convert the plurality of presentation information items recorded thereafter into bitmap images based on the style information.

In addition, the text information among the presentation information may include text to be converted into a bitmap image and in-line style information to be applied to only part of the text, and by applying the in-line style information only part of the text to which the style information pre-defined by the producer is applied, the subtitle decoder may provide a function emphasizing part of the text.

As the in-line style information, the subtitle decoder may apply a relative value of predetermined font information or a predetermined absolute value included in the style information pre-defined by the producer to part of the text.

In addition, the style information may further include user changeable style information, and after receiving selection information from a user on one style among the user changeable style information items, the subtitle decoder may apply the style information pre-defined by the producer, then apply the in-line style information, and then finally apply the user changeable style information item corresponding to the selection information to the text.

As the user changeable style information, the subtitle decoder may apply a relative value of predetermined font information among the style information items pre-defined by the producer to the text.

If the storage medium permits predetermined style information defined in a reproducing apparatus in addition to the style information pre-defined by the producer, the subtitle decoder may apply the predetermined style information to the text.

In addition, the style information may include a set of color palettes to be applied to the presentation information and based on a color defined in the color palette, the subtitle decoder may convert all presentation information items after the style information into bitmap images.

Separately from the set of color palettes included in the style information, the presentation information may further include a set of color palettes and a color update flag, and if the color update flag is set to "1", the subtitle decoder may apply the set of the color palettes included in the presentation information, and if the color update flag is set to "0", apply the original set of color palettes included in the style information.

By setting the color update flag to "1" and gradually changing the transparency value of a color palette included in the plurality of continuous presentation information items, the subtitle decoder may implement a fade in/out effect, and if the fade in/out effect is finished, reset a color look-up table (CLUT) in the subtitle decoder, based on the original set of color palettes included in the style information.

In addition, the style information may include region information indicating the location of a window region for the converted presentation information to be output on the image, and font information required for converting the presentation information into a bitmap image, and by using the region information and the font information, the subtitle decoder may convert the converted presentation information into a bitmap image.

The font information may include at least one of an output start location of the converted presentation information, an output direction, sort, line space, a font identifier, a font style, a font size, or a color, and the subtitle decoder converts the presentation information into a bitmap image based on the font information.

As the font identifier, the subtitle decoder may refer to indication information on a font file included in a clip information file storing attribute information of a recording unit of the image data.

In addition, the subtitle decoder may buffer the subtitle data and a font file referred to by the subtitle data before the image data is reproduced.

In addition, if a plurality of the subtitle data items supporting a plurality of languages are recorded on the storage medium, the subtitle decoder may receive selection information on a desired language from a user, and reproduce a subtitle data item corresponding to the selection information among the plurality of subtitle data items.

According to another aspect of the present invention, a method of reproducing data from a storage medium storing image data and text-based subtitle data to display a caption on an image based on the image data, comprises: decoding the image data; reading style information and a presentation information item; converting the presentation information item into a bitmap image based on the style information; and controlling output of the converted presentation information item synchronized with the decoded image data. The text-based subtitle data includes the presentation information which is a unit of displaying the caption and the style information which specifies an output style of the caption.

According to still another aspect of the present invention, a storage medium is provided to store: image data; and text-based subtitle data to display a caption on an image based on the image data, wherein the subtitle data includes: one style information item specifying an output style of the caption; and a plurality of presentation information items that are displaying units of the caption, and the subtitle data is separated from the image data and recorded separately.

Additional aspects and/or advantages of the invention will be set forth in part in the description which follows and, in part, will be obvious from the description, or may be learned by practice of the invention.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

FIG. 4 illustrates a text-based subtitle stream having the data structure shown in FIG. 3 according to an embodiment of the present invention;

FIG. 5 illustrates a dialog style unit shown in FIG. 3 according to an embodiment of the present invention;

FIG. 8 illustrates an example dialog style unit shown in FIG. 6 or 7 according to an embodiment of the present invention;

FIG. 15 illustrates dialog text information of FIG. 13 according to an embodiment of the present invention;

FIG. 16 is a diagram for explaining constraints in continuously reproducing continuous dialog presentation units (DPUs);

FIG. 23 illustrates an example status register disposed in an example reproducing apparatus for reproducing a text-based subtitle stream according to an embodiment of the present invention.

DETAILED DESCRIPTION OF THE EMBODIMENTS

The present invention will now be described more fully with reference to the accompanying drawings, in which example embodiments of the invention are shown.

Figure 1:
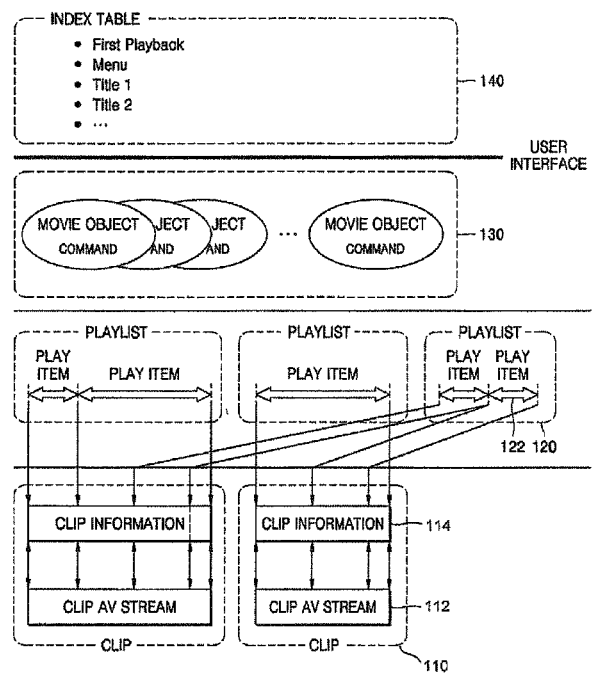
FIG. 1 is a diagram for explaining a multimedia data structure recorded on a storage medium according to an embodiment of the present invention.

Referring to FIG. 1, a storage medium (such as the medium 230 shown, for example, in FIG. 2) according to an example embodiment of the present invention is formed with multiple layers in order to manage a multimedia data structure 100 of multimedia image streams recorded thereon. The multimedia data structure 100 includes clips 110 that are recording units of a multimedia image, playlists 120 that are reproducing units of a multimedia image, movie objects 130 including navigation commands that are used to reproduce a multimedia image, and an index table 140 that is used to specify a movie object to be first reproduced and titles of movie objects 130.

The clips 110 are implemented as one object which includes a clip AV stream 112 for an audio-visual (AV) data stream for a high picture quality movie and clip information 114 for the attribute corresponding to the AV data stream. For example, the AV data stream may be compressed according to a standard, such as the motion picture experts group (MPEG). However, such clips 110 need not require the AV data stream 112 to be compressed in all aspects of the present invention. In addition, the clip information 114 may include audio/video properties of the AV data stream 112, an entry point map in which information regarding a location of a randomly accessible entry point is recorded in units of a predetermined section and the like.

The playlist 120 is a set of reproduction intervals of these clips 110, and each reproduction interval is referred to as a play item 122. The movie object 130 is formed with navigation command programs, and these navigation commands start reproduction of a playlist 120, switch between movie objects 130, or manage reproduction of a playlist 120 according to preference of a user.

The index table 140 is a table at the top layer of the storage medium to define a plurality of titles and menus, and includes start location information of all titles and menus such that a title or menu selected by a user operation, such as title search or menu call, can be reproduced. The index table 140 also includes start location information of a title or menu that is automatically reproduced first when a storage medium is placed on a reproducing apparatus.

Figure 2:
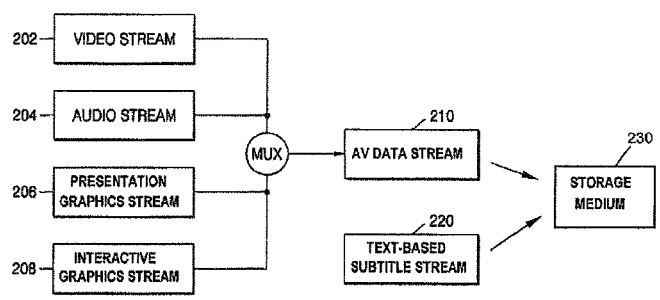
FIG. 2 illustrates an example data structure of a clip AV stream shown in FIG. 1 and a text-based subtitle stream according to an embodiment of the present invention.

Among these items, the structure of the clip AV stream in which a multimedia image is compression-coded will now be explained with reference to FIG. 2. FIG. 2 illustrates an example data structure of an AV data stream 210 shown in FIG. 1 and a text-based subtitle stream 220 according to an embodiment of the present invention.

Referring to FIG. 2, in order to solve problems relating to bitmap-based caption data as described above, a text-based subtitle data stream 220 according to an embodiment of the present invention is provided separately from the clip AV data stream 210 recorded on a storage medium 230, such as a digital versatile disc (DVD). The AV data stream 210 includes a video stream 202, an audio stream 204, a presentation graphics stream 206 for providing subtitle data, and an interactive graphics stream 208 for providing buttons or menus to interact with a user, all of which are multiplexed in a moving picture main stream, known as an audio-visual "AV" data stream, and recorded on the storage medium 230.

The text-based subtitle data 220 according to an embodiment of the present invention represents data for providing subtitles or captions of a multimedia image to be recorded on the storage medium 230, and can be implemented by using a markup language, such as an extensible markup language (XML). However, such subtitles or captions of a multimedia image are provided using binary data. Hereinafter, the text-based subtitle data 220 providing the caption of a multimedia image using binary data will be referred to briefly as a "text-based subtitle stream". The presentation graphics stream 206 for providing subtitle data or caption data also provides bitmap-based subtitle data in order to display subtitles (or captions) on a screen.

Since the text-based subtitle data stream 220 is recorded separately from the AV data stream 210, and is not multiplexed with the AV data stream 210, the size of the text-based subtitle data stream 220 is not limited thereto. As a result, subtitles or captions can be provided using a plurality of languages. Moreover, the text-based subtitle data stream 220 can be conveniently produced and effectively edited without any difficulty.

The text-based subtitle stream 220 is then converted into a bitmap graphic image, and is output on a screen, overlaid over a multimedia image. The process converting text-based data thus into a graphic-based bitmap image is referred to as rendering. The text-based subtitle stream 220 includes information required for rendering caption text.

Figure 3:
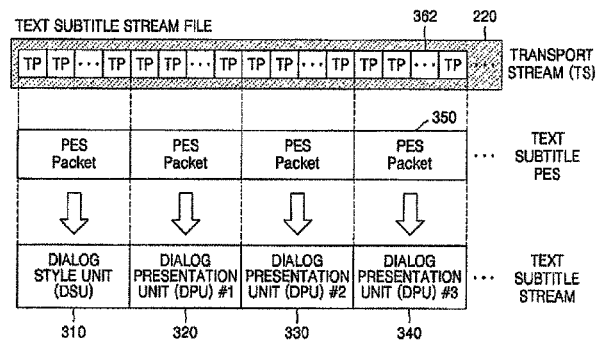
FIG. 3 is a diagram for explaining an example data structure of a text-based subtitle stream according to an embodiment of the present invention.

The structure of the text-based subtitle stream 220 including rendering information will now be explained in detail with reference to FIG. 3. FIG. 3 is a diagram for explaining an example data structure of the text-based subtitle stream 220 according to an embodiment of the present invention.

Referring to FIG. 3, the text-based subtitle stream 220 according to an embodiment of the present invention includes a dialog style unit (DSU) 310, and a plurality of dialog presentation units (DPU) 320 through 340. The DSU 310 and the DPUs 320-340 are also referred to as a dialog unit. Each of the dialog units 310-340 forming the text-based subtitle stream 220 is recorded in the form of a packetized elementary stream (PES), or simply known as a PES packet 350. Also, the PES of the text-based subtitle stream 220 is recorded and transmitted in units of transport packets (TP) 362. A series of the TPs is referred to as a transport stream (TS).

However, the text-based subtitle stream 220 according to an embodiment of the present invention is not multiplexed with the AV data stream 210 and is recorded as a separate TS on a storage medium 230, as shown in FIG. 2.

Referring again to FIG. 3, in one PES packet 350 included in the text-based subtitle stream 220, one dialog unit is recorded. The text-based subtitle stream 220 includes one DSU 310 positioned at the front and a plurality of DPUs 320 through 340 following the DSU 310. The DSU 310 includes information specifying the output style of a dialog in a caption displayed on the screen on which a multimedia image is reproduced. Meanwhile, the plurality of DPUs 320 through 340 include text information items on the dialog contents to be displayed and information on respective output times.

FIG. 4 illustrates a text-based subtitle stream 220 having the data structure shown in FIG. 3 according to an embodiment of the present invention.

Referring to FIG. 4, the text-based subtitle stream 220 includes one DSU 410 and a plurality of DPUs 420.

In the example embodiment of the present invention, the number of DPUs is defined as num_of_dialog_presentation_units. However, the number of DPUs may not be specified separately. An example case is using a syntax such as while (processed_length<end_of_file).

The data structures of a DSU and a DPU will now be explained in more detail with reference to FIG. 5. FIG. 5 illustrates a dialog style unit shown in FIG. 3 according to an embodiment of the present invention.

Referring to FIG. 5, in the DSU 310, a set of dialog style information items, dialog_styleset( ) 510, in which output style information items of a dialog to be displayed as a caption are collected, is defined. The DSU 310 includes information on the location of a region in which a dialog is displayed in a caption, information required for rendering a dialog, information on styles that a user can control, and so on. The detailed contents of data will be explained later.

Figure 6:
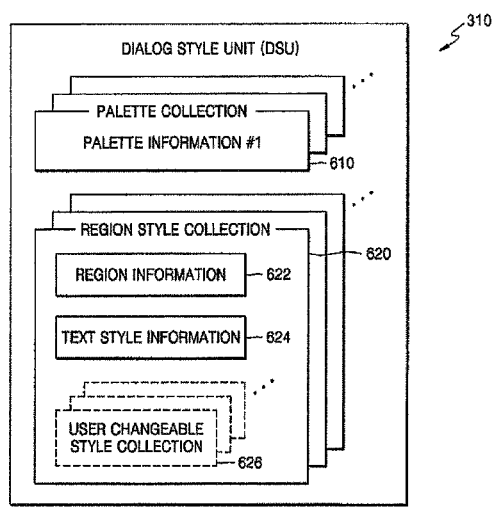
FIG. 6 is a diagram for explaining an example data structure of a dialog style unit according to an embodiment of the present invention.

FIG. 6 is a diagram for explaining an example data structure of a dialog style unit (DSU) according to an embodiment of the present invention.

Referring to FIG. 6, the DSU 310 includes a palette collection 61 and a region style collection 620. The palette collection 610 is a set of a plurality of color palettes defining colors to be used in a caption. A color combination or color information, such as a transparency degree, included in the palette collection 610 can be applied to all of the plurality of DPUs located after the DSU.

The region style collection 620 is a set of output style information items of respective dialogs forming a caption. Each region style includes region information 622 indicating a location in which a dialog is to be displayed on a screen; text style information 624 indicating an output style to be applied to the text of each dialog; and a user changeable style collection 626 indicating styles that a user can change arbitrarily to be applied to the text of each dialog.

Figure 7:
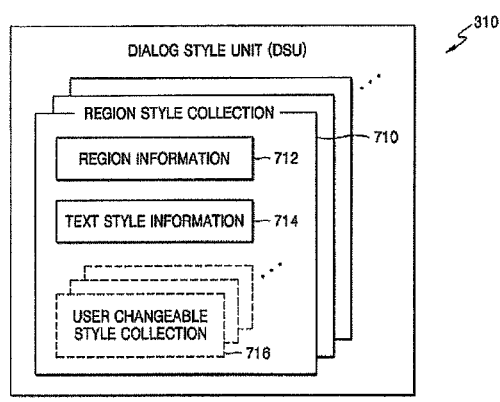
FIG. 7 is a diagram for explaining an example data structure of a dialog style unit according to another embodiment of the present invention.

FIG. 7 is a diagram for explaining an example data structure of a dialog style unit according to another embodiment of the present invention.

Referring to FIG. 7, unlike FIG. 6, the palette collection 610 is not included. That is, a color palette collection is not defined in the DSU 310, but a palette collection 610 is defined in a DPU to be explained with reference to FIG. 12A and FIG. 12B. The data structure of each region style 710 is the same as described above with reference to FIG. 6.

FIG. 8 illustrates a dialog style unit shown in FIG. 6 or 7 according to an embodiment of the present invention.

Referring to FIG. 8 and FIG. 6, the DSU 310 includes a palette collection 860 and 610 and a plurality of region styles 820 and 620. As described above, the palette collection 610 is a set of a plurality of color palettes defining colors to be used in a caption. A color combination or color information, such as a transparency degree, included in the palette collection 610 can be applied to all of the plurality of DPUs located after the DSU.

Meanwhile, each region style 820 and 620 includes region information 830 and 622 indicating information on a window region in which a caption is to be displayed on a screen, and the region information 830 and 622 includes information on X, Y coordinates, the width, height, background color, and so on of the window region in which a caption is to be displayed on a screen.

Also, each region style 820 and 620 includes text style information 840 and 624 indicating an output style to be applied to the text of each dialog. That is, X, Y coordinates of the location in which the text of a dialog is to be displayed in the window region described above, the output direction of text such as from the left-hand side to the right-hand side, or from upside to downside, sort, line space, an identifier of a font to be referred to, a font style such as bold or Italic, a font size, and information on a font color, and so on can be included.

Furthermore, each region style 820 and 620 can also include a user changeable style collection 850 and 626 indicating styles that a user can change arbitrarily. However, the user changeable style collection 850 and 626 is optional. The user changeable style collection 850 and 626 can include change information on the location of a window region, the output location of text, the font size, and line space among text output style information items 840 and 624. Each change information item can be expressed as a relatively increased or decreased value in relation to information on output styles 840 and 624 to be applied to the text of each dialog.

To summarize the above, there are three types of style relation information, style information (region_style) 620 defined in the region style 820 and 620, inline style information (inline_style) 1510 to be explained later and to emphasize part of a caption, and user changeable style information (user_changeable_style) 850, and the order of applying these information items is as follows:

1) Basically, region style information 620 defined in a region style is applied.

2) If there is in-line style information, the in-line style information 1510 is applied overlaid over a part in which region style information is applied, and emphasizing a part of the caption text.

3) If there is user changeable style information 850, this information is applied finally. The presence of use changeable style information is optional.

Meanwhile, among text style information items 840 and 624 to be applied to text of each dialog, font file information to be referred to by the identifier of a font (font_id) 842 can be defined as follows.

Figure 9A:
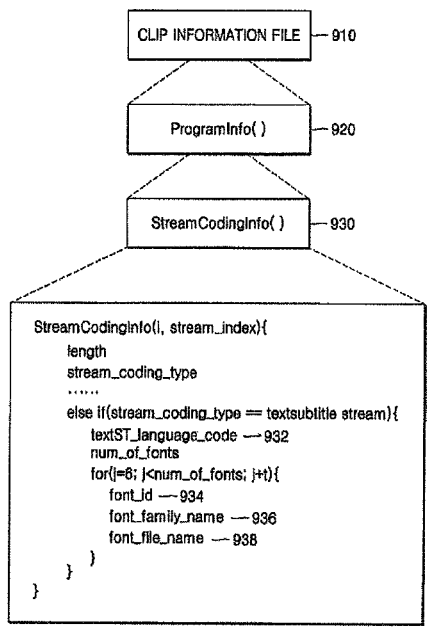
FIGS. 9A and 9B illustrate an example clip information file including a plurality of font collections referred to by font information according to an embodiment of the present invention.

FIG. 9A illustrates an example clip information file 910 including a plurality of font collections referred to by font information 842 shown in FIG. 8 according to an embodiment of the present invention.

Referring to FIG. 9A, FIG. 8, FIG. 2 and FIG. 1, in Stream-CodingInfo( ) 930 that is a stream coding information structure included in the clip information file 910 and 110, information on a variety of streams recorded on a storage medium according to the present invention is included. That is, information on a video stream 202, an audio stream, a presentation graphics stream, an interactive graphics stream, a text-based subtitle stream and so on is included. In particular, in relation to the text-based subtitle stream 220, information (textST_language_code) 932 on a language to display a caption can be included. Also, a font name 936 and a file name 938 of a file storing font information, corresponding to font_id 842 and 934 indicating the identifier of a font to be referred to and shown in FIG. 8 can be defined. A method for finding a font file corresponding to the identifier of a font to be referred to and defined here will be explained later with reference to FIG. 10.

Figure 9B:
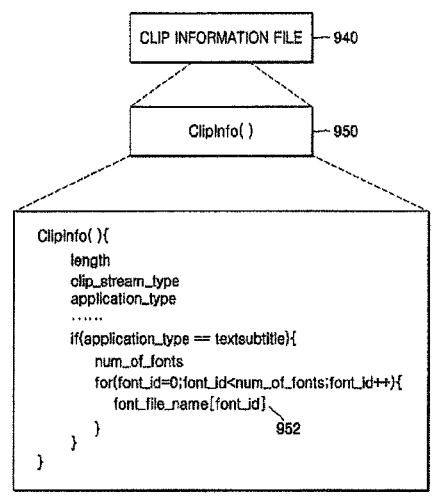

FIG. 9B illustrates an example clip information file 940 including a plurality of font collections referred to by font information 842 shown in FIG. 8 according to another embodiment of the present invention.

Referring to FIG. 9B, a structure, ClipInfo( ), can be defined in the clip information file 910 and 110. In this structure, a plurality of font collections referred to by the font information 842 shown in FIG. 8 can be defined. That is, a font file name 952 corresponding to font_id 842 indicating the identifier of a font to be referred and shown in FIG. 8 is specified. The method for finding a font file corresponding to the identifier of a font defined here and to be referred to will now be explained.

Figure 10:
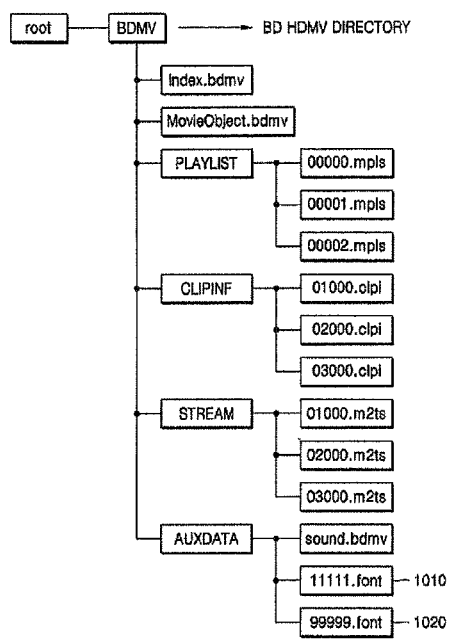
FIG. 10 is a diagram showing locations of a plurality of font files referred to by font file information, shown in FIGS. 9A and 9B.

FIG. 10 is a diagram showing locations of a plurality of font files referred to by the font file name 938 and 952 in FIG. 9A and FIG. 9B.

Referring to FIG. 10, a directory structure of files to be related to a multimedia image recorded on a storage medium according to an embodiment of the present invention is shown. In particular, by using the directory structure, the location of a font file such as 11111.font 1010 or 99999.font 1020 stored in an auxiliary data (AUXDATA) directory can be easily found.

Meanwhile, the structure of a DPU forming a dialog unit will now be explained in more detail with reference to FIG. 11.

Figure 11:
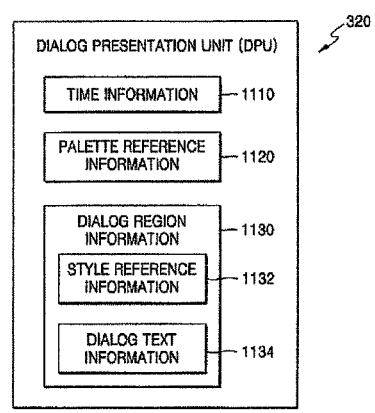
FIG. 11 is a diagram for explaining an example data structure of a dialog presentation unit shown in FIG. 3 according to another embodiment of the present invention.

FIG. 11 is a diagram for explaining an example data structure of the DPU 320 shown in FIG. 3 according to other embodiments of the present invention.

Referring to FIG. 11 and FIG. 3, the DPU 320 including text information on dialog contents to be output and information on a display time includes time information 1110 indicating a time for a dialog to be output on a screen, palette reference information 1120 specifying a color palette to be referred to, and dialog region information 1130 for a dialog to be output on a screen. In particular, the dialog region information 1130 for a dialog to be output on a screen includes style reference information 1132 specifying an output style to be applied to the dialog and dialog text information 1134 indicating the text of a dialog to be actually output on a screen. In this case, it is assumed that the color palette collection indicated by the palette reference information 1120 is defined in a DSU (Refer to 610 of FIG. 6).

Figure 12A:
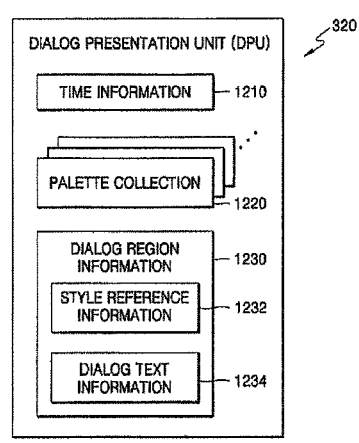
FIGS. 12A and 12B are diagrams for explaining an example data structure of a dialog presentation unit shown in FIG. 3 according to other embodiments of the present invention.

Meanwhile, FIG. 12A is a diagram for explaining an example data structure of the DPU 320 shown in FIG. 3 according to an embodiment of the present invention.

Referring to FIG. 12A and FIG. 3, the DPU 320 includes time information 1210 indicating a time for a dialog to be output on a screen, a palette collection 1220 defining a color palette collection, and dialog region information 1230 for a dialog to be output on a screen. In this case, the palette collection 1220 is not defined in a DSU as shown in FIG. 11, but is defined directly in the DPU 320.

Figure 12B:
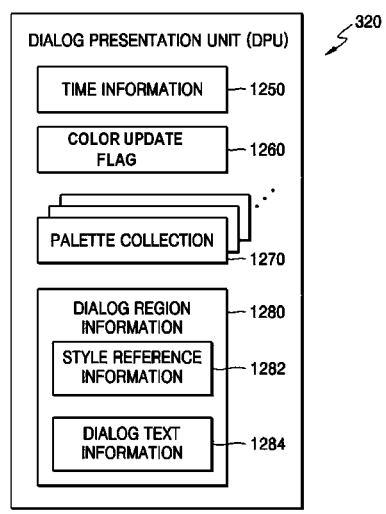

Meanwhile, FIG. 12B is a diagram for explaining an example data structure of the DPU 320 shown in FIG. 3 according to an embodiment of the present invention.

Referring to FIG. 12B, the DPU 320 includes time information 1250 indicating a time for a dialog to be output on a screen, a color update flag 1260, a color palette collection 1270 to be used when the color update flag is set to 1, and a dialog region information 1280 for a dialog to be output on a screen. In this case, the palette collection 1270 is also defined in a DSU as in FIG. 11, and is also stored in the DPU 320. In particular, in order to express fade-in/out using continuous reproduction, in addition to a basic palette collection defined in a DSU, a color palette collection 1270 to be used to express fade-in/out is defined in the DPU 320 and the color update flag 1260 can be set to 1. This will be explained in more detail with reference to FIG. 19.

Figures 13, 14:
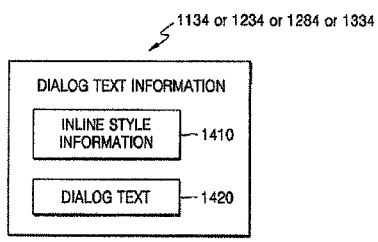
FIG. 13 illustrates a dialog presentation unit shown in FIGS. 11 through 12B according to an embodiment of the present invention.
FIG. 14 is a diagram for explaining an example data structure of dialog text information shown in FIG. 13.

FIG. 13 illustrates the DPU 320 shown in FIGS. 11 through 12B according to an embodiment of the present invention.

Referring to FIG. 13, FIG. 11, FIG. 12A and FIG. 12B, the DPU includes dialog start time information (dialog_start_PTS) and dialog end time information (dialog_end_PTS) 1310 as time information 1110 indicating a time for a dialog to be output on a screen. Also, dialog palette identifier (dialog_palette_id) is included as palette reference information 1120. In case of FIG. 12A, the color palette collection 1220 can be included instead of the palette reference information 1120. Dialog text information (region_subtitle) 1334 is included as dialog region information 1230 for a dialog to be output, and in order to specify an output style to be applied to it, a region style identifier (region_style_id) 1332 can be included. The example shown in FIG. 13 is just an embodiment of a DPU and the DPU having data structures shown in FIGS. 11 through 12B can be implemented with modification in a variety of ways.

FIG. 14 is a diagram for explaining the data structure of dialog text information (region_subtitle) shown in FIG. 13.

Referring to FIG. 14, dialog text information 1134 shown in FIG. 11, 1234 shown in FIG. 12A, 1284 shown in FIG. 12B, and 1334 shown in FIG. 13, includes inline style information 1410 and dialog text 1420 as an output style to emphasize part of a dialog.

FIG. 15 illustrates dialog text information 1334 shown in FIG. 13 according to an embodiment of the present invention. As shown in FIG. 15, the dialog text information 1334 is implemented by inline style information (inline_style) 1510 and dialog text (text_string) 1520. Also, it is preferable that information indicating the end of an inline style is included in the embodiment shown in FIG. 15. Unless the end part of an in-line style is defined, an in-line style once specified may be applied to continuously thereafter contrary to the intention of a producer.

Meanwhile, FIG. 16 is a diagram for explaining constraints in continuously reproducing continuous DPUs.

Referring to FIG. 16 and FIG. 13, when the plurality of DPUs as described above are needed to be reproduced continuously, the following constraints are needed.

1) Dialog start time information (dialog_start_PTS) 1310 defined in a DPU indicates a time when a dialog object begins to be output on a graphic plane (GP) to be explained later with reference to FIG. 17.

2) Dialog end time information (dialog_end_PTS) 1310 defined in a DPU indicates a time to reset a text-based subtitle decoder processing a text-based subtitle to be explained later with reference to FIG. 17.

3) When a plurality of DPUs described above are needed to be reproduced continuously, the dialog end time information (dialog_end_PTS) of a current DPU should be the same as the dialog start time information (dialog_start_PTS) of a DPU to be reproduced continuously next. That is, in FIG. 16, in order to continuously reproduce DPU #2 and DPU #3, the dialog end time information included in DPU #2 should be the same as the dialog start time information included in DPU #3.

Meanwhile, it is preferable that a DSU according to the present invention satisfies the following constraints.

1) A text-based subtitle stream 220 includes one DSU.

2) The number of user changeable style information items (user_control_style) included in all region styles (region_style) should be identical.

Meanwhile, it is preferable that a DPU according to the present invention satisfies the following constraints.

1) A window region for at least two captions should be defined.

The structure of an example reproducing apparatus based on the data structure of a text-based subtitle stream 220 recorded on a storage medium according to an embodiment of the present invention will now be explained with reference to FIG. 17 herein below.

Figure 17:
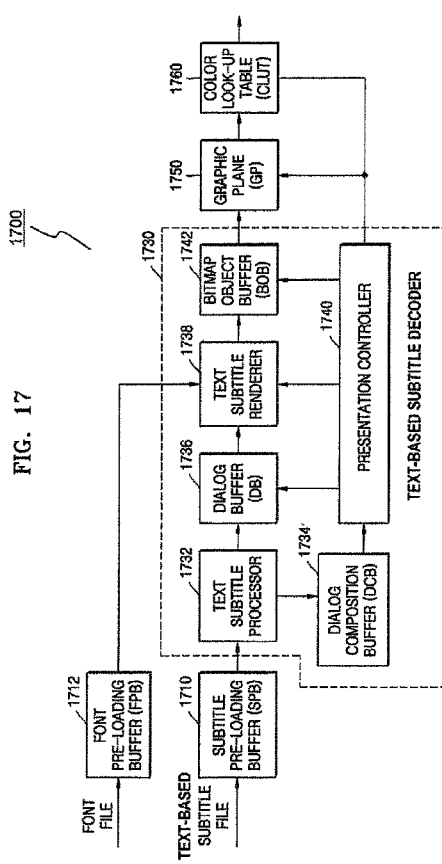
FIG. 17 is a diagram for explaining an example reproducing apparatus for reproducing a text-based subtitle stream according to an embodiment of the present invention.

FIG. 17 is a diagram for explaining the structure of an example reproducing apparatus for reproducing a text-based subtitle stream according to an embodiment of the present invention.

Referring to FIG. 17, the reproducing apparatus 1700, also known as a playback device, includes a buffer unit which comprises a font preloading buffer (FPB) 1710 for storing font files, and a subtitle preloading buffer (SPB) 1712 for storing text-based subtitle files, and a text-based subtitle decoder 1730 which decodes and reproduces the text-based subtitle stream previously recorded on a storage medium, as an output, via a graphics plane (GP) 1750 and a color look-up table (CLUT) 1760.

Specifically, the buffer unit includes a subtitle pre-loading buffer (SPB) 1710 in which a text-based subtitle data stream 220 is pre-loaded, and a font pre-loading buffer (FPB) 1712 in which font information is pre-loaded.

The subtitle decoder 1730 includes a text subtitle processor 1732, a dialog composition buffer (DCB) 1734, a dialog buffer (DB) 1736, a text subtitle renderer 1738, a dialog presentation controller 1740, and a bitmap object buffer (BOB) 1742.

The text subtitle processor 1732 receives the text-based subtitle data stream 220 from the text subtitle pre-loading buffer (SPB) 1710, transfers style related information included in the DSU and dialog output time information included in the DPU described above, to the dialog composition buffer (DCB) 1734, and transfers dialog text information included in the DPU, to the dialog buffer (DB) 1736.

The presentation controller 1740 controls the text renderer 1738 by using the style related information included in the dialog composition buffer (DCB) 1734, and by using the dialog output time information, controls a time for a bitmap image rendered in the bitmap object buffer (BOB) 1742 to be output to the graphics plane (GP) 1750.

According to control of the presentation controller 1740, the text subtitle renderer 1738 converts dialog text information into a bitmap image, that is, performs rendering, by applying a font information item corresponding to dialog text information stored in the dialog buffer (DB) 1736 among font information items pre-loaded in the font preloading buffer (FPB) 1712, to the dialog text information. The rendered bitmap image is stored in the bitmap object buffer (BOB) 1742 and according to control of the presentation controller 1740, is output to the graphics plane (GP) 1750. At this time, a color specified in the DSU is applied by referring to the color look-up table (CLUT) 1760.

As style relation information to be applied to dialog text, information defined in the DSU by a producer can be used, and style related information pre-defined by a user can also be applied. The reproducing apparatus 1700, as shown in FIG. 17, applies the style information defined by a user prior to the style related information defined by a producer.

As described with reference to FIG. 8, as style related information to be applied to dialog text, region style information (region_style) defined in a DSU by a producer is basically applied, and if an in-line style is included in a DPU including dialog text to which the region style information is applied, in-line style information (inline_style) is applied to the corresponding part. Also, if a producer defines user changeable styles additionally in the DSU and one of the user changeable styles defined by a user is selected, the region style and/or in-line style are applied and then, the user changeable style is finally applied. Also, as described with reference to FIG. 15, it is preferable that information indicating the end of applying an inline style is included in the contents of the in-line style.

Furthermore, a producer can specify whether to permit or prohibit using style related information defined in the reproducing apparatus itself separately from the style related information defined by the producer and recorded on a storage medium.

Figure 18:
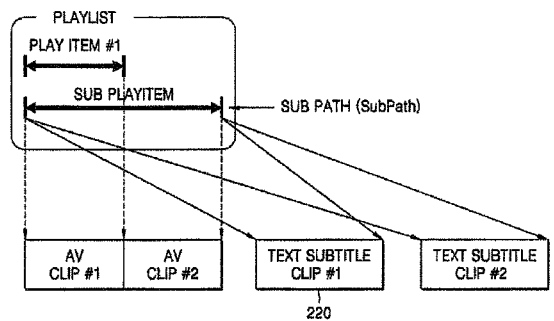
FIG. 18 is a diagram for explaining a pre-loading process of a text-based subtitle stream in an example reproducing apparatus according to an embodiment of the present invention.

FIG. 18 is a diagram explaining a pre-loading process of a text-based subtitle data stream 220 in a reproducing apparatus 1700, as shown, for example, in FIG. 17, according to an embodiment of the present invention.

Referring to FIG. 18, a text-based subtitle data stream 220, shown in FIG. 2, is defined in a subpath of the playlist described above. In the subpath, a plurality of text-based subtitle data streams 220 supporting a plurality of languages can be defined. Also, a font file to be applied to a text-based subtitle can be defined in a clip information file 910 or 940 as described above with reference to FIG. 9A and FIG. 9B. Up to 255 text-based subtitle data streams 220 that can be included in one storage medium can be defined in each playlist. Also, up to 255 font files that can be included in one storage medium can be defined. However, in order to guarantee seamless presentation, the size of a text-based subtitle data stream 220 should be smaller than or equal to that of the pre-loading buffer 1710 of a reproducing apparatus 1700, shown, for example, in FIG. 17.

Figure 19:
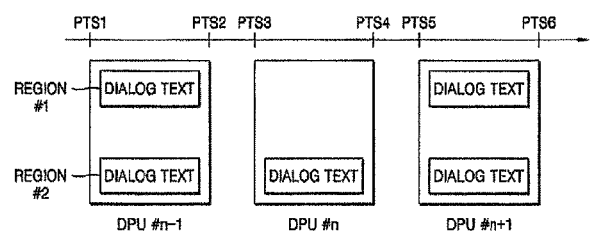
FIG. 19 is a diagram for explaining a reproduction process of a dialog presentation unit (DPU) in an example reproducing apparatus according to an embodiment of the present invention.

FIG. 19 is a diagram explaining a reproduction process of a DPU in a reproducing apparatus according to the present invention.

Referring to FIG. 19, FIG. 13, and FIG. 17, the process of reproducing a DPU is shown. The presentation controller 1740 controls a time for a rendered dialog to be output on a graphics plane (GP) 1750, shown in FIG. 17, by using dialog start time information (dialog_start_PTS) and dialog end time information (dialog_end_PTS) specifying the output time 1310 of a dialog included in a DPU. At this time, the dialog start time information specifies a time when transferring a rendered dialog bitmap image stored in the bitmap object buffer (BOB) 1742 included in the text-based subtitle decoder 1730 to the graphics plane (GP) 1750 is completed. That is, if it is the dialog start time defined in the DPU, bitmap information required for constructing a dialog should be ready to be used after transferring the information to the graphics plane (GP) 1750 is completed. Also, the dialog end time information specifies a time when reproducing a DPU is finished. At this time, both the subtitle decoder 1730 and the graphics plane (GP) 1750 are reset. It is preferable that a buffer in the subtitle decoder 1730 such as the bitmap object buffer (BOB) 1742 is reset between a start time and an end time of a DPU regardless of continuous reproduction.

However, when continuous reproduction of a plurality of DPUs is needed, the subtitle decoder 1730 and the graphics plane 1750 are not reset and the contents stored in each buffer, such as the dialog composition buffer (DCB) 1734, the dialog buffer (DB) 1736, and the bitmap object buffer (BOB) 1742, should be maintained. That is, when the dialog end time information of a DPU currently being reproduced and the dialog start time information of a DPU to be continuously reproduced thereafter is the same, the contents of each buffer are not reset but maintained.

In particular, as an example of applying continuous reproduction of a plurality of DPUs, there is a fade in/out effect. The fade in/out effect can be implemented by changing a color look-up table (CLUT) 1760 of a bitmap object which is transferred to the graphics plane (GP) 1750. That is, a first DPU includes composition information such as a color, a style, and an output time, and a plurality of DPUs continuing thereafter have composition information identical to that of the first DPU, but update only color palette information. In this case, by gradually changing transparency among color information items, from 0% to 100%, the fade in/out effect can be implemented.

In particular, when the data structure of the DPU as shown in FIG. 12B is used, the fade in/out effect can be effectively implemented by using the color update flag 1260. That is, if the dialog presentation controller 1740 checks and confirms that the color update flag 1260 included in the DPU is set to "0", that is, if it is an ordinary case not requiring the fade in/out effect, color information included in the DSU shown in FIG. 6 is basically used. However, if the presentation controller 1740 confirms that the color update flag 1260 is set to "1", that is, if the fade in/out effect is needed, by using color information 1270 included in the DPU, instead of using the color information 610 included in the DSU shown in FIG. 6, the fade in/out effect can be implemented. At this time, by adjusting the transparency of the color information 1270 included in the DPU, the fade in/out effect can be implemented simply.

After thus showing the fade in/out effect, it is preferable to update the color look-up table (CLUT) 1760 to the original color information included in the DSU. This is because unless it is updated, the color information once specified can be applied continuously thereafter contrary to the intention of the producer.

Figure 20:
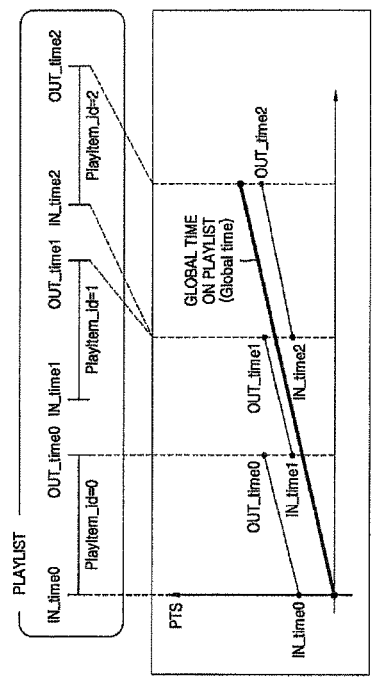
FIG. 20 is a diagram for explaining a process in which a text-based subtitle stream is synchronized with moving picture data and output in an example reproducing apparatus according to an embodiment of the present invention.

FIG. 20 is a diagram explaining a process in which a text-based subtitle stream is synchronized with moving picture data and output in a reproducing apparatus according to an embodiment of the present invention.

Referring to FIG. 20, the dialog start time information and dialog end time information included in a DPU of the text-based subtitle data stream 220 should be defined as time points on a global time axis used in a playlist so as to be synchronized with the output time of an AV data stream 210 of a multimedia image. Accordingly, discontinuity between the system time clock (STC) of an AV data stream and the dialog output time (PTS) of the text-based subtitle data stream 220 can be prevented.

Figure 21:
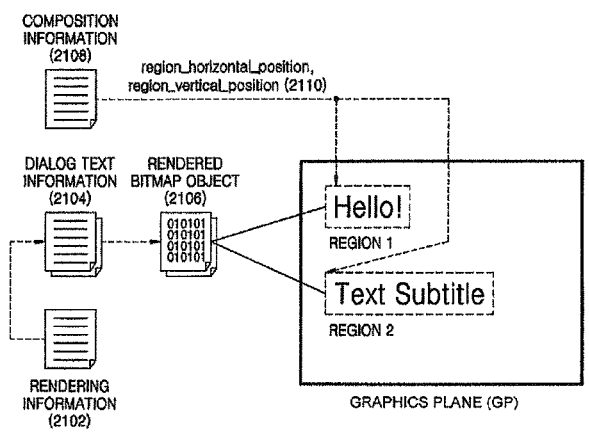
FIG. 21 is a diagram for explaining a process in which a text-based subtitle stream is output to a screen in an example reproducing apparatus according to an embodiment of the present invention.

FIG. 21 is a diagram explaining a process in which a text-based subtitle data stream is output to a screen in a reproducing apparatus according to an embodiment of the present invention.

Referring to FIG. 21, shown is a process in which by applying rendering information 2102 including style related information, dialog text information 2104 is converted into a bitmap image 2106, and the converted bitmap image is output at a corresponding location on a graphics plane (GP) 1750, based on output location information (such as region_horizontal_position, and region_vertical_position) included in composition information 2108.

Rendering information 2102 represents style information such as the width of a region, the height, a foreground color, a background color, text sort, a font name, a font style, and a font size. As described above, the rendering information 2102 is defined in the region style collection in a DSU. Meanwhile, the composition information 2108 indicates the start time and end time of presentation, horizontal and vertical location information of a window region in which a caption is output on a graphics plane (GP) 1750 and so on. This is defined in a DPU.

Figure 22:
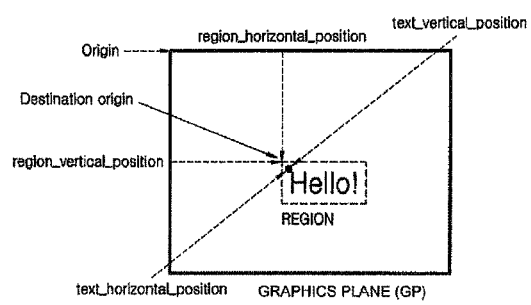
FIG. 22 is a diagram for explaining a process of rendering a text-based subtitle stream in an example reproducing apparatus according to an embodiment of the present invention.

FIG. 22 is a diagram explaining a process of rendering a text-based subtitle data stream 220 in a reproducing apparatus 1700, shown, for example, in FIG. 17 according to an embodiment of the present invention.

Referring to FIG. 22, FIG. 21, and FIG. 8, a window region specified by using region_horizontal_position, region_vertical_position, region_width, and region_height that are location information 830 of a window region for a caption defined in a DSU is specified as a region in which a caption is displayed on a graphics plane (GB) 1750. The bitmap image of a rendered dialog is displayed from a start point location specified by text_horizontal_position and text_vertical_position that are the output location 840 of the dialog in the window region.

Meanwhile, a reproducing apparatus according to the present invention stores style information (style_id) selected by a use in a system register area. FIG. 23 illustrates an example status register disposed in a reproducing apparatus for reproducing a text-based subtitle data stream according to an embodiment of the present invention.

Referring to FIG. 23, the status register (player status registers, hereinafter referred to as PSRs) stores style information (Selected Style 2310) selected by a user in the 12th register. Accordingly, for example, even after the reproducing apparatus 1700, shown, for example, in FIG. 17, performs a menu call or another operation, if the user pushes a style information change button, the style information selected previously by the user can be made to be applied first by referring to PSR 12. The register storing the information can be changed.

Figure 24:
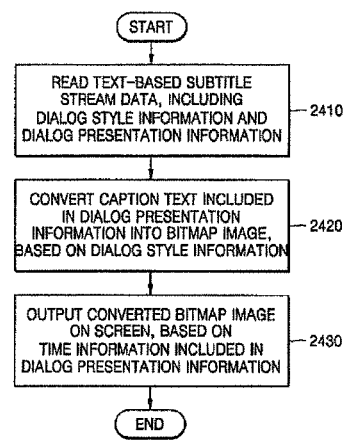
FIG. 24 is a flowchart of a method of reproducing a text-based subtitle stream according to an embodiment of the present invention.

A method of reproducing a text-based subtitle data stream 220 based on a storage medium recording the text-based subtitle stream 220 and the structure of a reproducing apparatus reproducing the subtitle data stream 220 described above will now be explained with reference to FIG. 24. FIG. 24 is a flowchart of the operations of a method of reproducing a text-based subtitle data stream 220 according to an embodiment of the present invention.

Text-based subtitle data stream 220 including DSU information and DPU information is read from a storage medium 230, shown, for example, in FIG. 2, in operation 2410, and based on rendering information included in the DSU information, caption text included in the DPU information is converted into a bitmap image in operation 2420. The converted bitmap image is output on a screen according to time information and location information that are composition information included in the DPU information, in operation 2430.

As described from the foregoing, the present invention advantageously provides a storage medium storing a text-based subtitle data stream separately from image data, a reproducing apparatus and a reproducing method for reproducing such text-based subtitle data stream such that production of subtitle data and edition of produced subtitle data can be made easier. Also, regardless of the number of subtitle data items, a caption can be provided in a plurality of languages.

In addition, since subtitle data is formed with one style information item (DSU) and a plurality of presentation information items (DPUs), an output style to be applied to the entire presentation data can be defined in advance, and can be changed in a variety of ways, and an in-line style to emphasize part of a caption and a user changeable style can also be defined.

Furthermore, by using a plurality of neighboring presentation information items, continuous reproduction of a caption is enabled and by applying this, fade in/out and other effects can be easily implemented.

Example embodiments of the present invention can also be written as computer programs and can be implemented in general-use digital computers that execute the programs using a computer readable medium. Examples of the computer readable medium include magnetic storage media (e.g., ROM, floppy disks, hard disks, etc.), optical recording media (e.g., CD-ROMs, DVDs, etc.), and storage media such as carrier waves (e.g., transmission through the Internet). The computer readable medium can also be distributed over network coupled computer systems so that the computer readable code is stored and executed in a distributed fashion.

While there have been illustrated and described what are considered to be example embodiments of the present invention, it will be understood by those skilled in the art and as technology develops that various changes and modification may be made, and equivalents may be substituted for elements thereof without departing from the spirit and scope of the present invention. Many modifications may be made to adapt the teachings of the present invention to a particular situation without departing from the scope thereof. For example, any computer readable media or data storage devices may be utilized, as long as text-based subtitle data and AV data are recorded separately thereon. In addition, text-based subtitle data can also be configured differently as shown in FIG. 3 or FIG. 4. Moreover, a reproducing apparatus as shown in FIG. 17 can be implemented as part of a recording apparatus, or alternatively a single apparatus for performing recording and/or reproducing functions with respect to a storage medium. Similarly, the CPU can be implemented as a chipset having firmware, or alternatively, a general or special purposed computer programmed to perform the methods as described, for example, with reference to FIG. 24. Accordingly, it is intended, therefore, that the present invention not be limited to the various example embodiments disclosed, but that the present invention includes all embodiments falling within the scope of the appended claims.

What is claimed is:

1. A non-transitory computer readable storage medium, comprising:
    audio-visual data; and
    text-based subtitle data to provide subtitles of the audio-visual data,
    wherein the text-based subtitle data comprises a plurality of dialog presentation units and a dialog style unit defining a set of output styles to be applied to the dialog presentation units, and
    each dialog presentation unit comprises dialog text information, time information indicating a time for the dialog text information to be output, palette information defining colors to be applied to the dialog text information, and a color update flag indicating whether only the palette information has changed as compared with a graphical composition of a previous dialog presentation unit.

2. The non-transitory computer readable storage medium as claimed in claim 1, wherein, if the color update flag is set to 1, the palette information is applied to a previous dialog text information output according to the previous dialog presentation unit.

3. The non-transitory computer readable storage medium as claimed in claim 1, wherein, if the color update flag is set to 0, the palette information is applied to the dialog text information output according to a current dialog presentation unit.

4. An apparatus to reproduce data from a storage medium storing audio-visual data and text-based subtitle data to provide subtitles of the audio-visual data, the apparatus comprising:
    a video decoder to decode the audio-visual data; and
    a subtitle decoder to receive the text-based subtitle data comprising a plurality of dialog presentation units and a dialog style unit defining a set of output styles to be applied to the dialog presentation units, converting the dialog presentation units into bitmap images based on the dialog style unit, and controlling an output of the converted dialog presentation units synchronized with decoded audio-visual data,
    wherein each dialog presentation unit comprises dialog text information, time information indicating a time for the dialog text information to be output, palette information defining colors to be applied to the dialog text information, and a color update flag indicating whether only the palette information has changed as compared with a graphical composition of a previous dialog presentation unit.

5. The apparatus as claimed in claim 4, wherein, if the color update flag is set to 1, the subtitle decoder applies the palette information to a previous dialog text information output according to the previous dialog presentation unit.

6. The apparatus as claimed in claim 4, wherein, if the color update flag is set to 0, the subtitle decoder applies the palette information to the dialog text information output according to a current dialog presentation unit.

* * * * *